(12) United States Patent
Bronner et al.

(10) Patent No.: US 11,359,713 B2
(45) Date of Patent: Jun. 14, 2022

(54) TRANSMISSION INCLUDING A TRANSMISSION HOUSING

(71) Applicant: SEW-EURODRIVE GMBH & CO. KG, Bruchsal (DE)

(72) Inventors: Aaron Bronner, Maulbronn (DE); Pablo Barreiro, Karlsruhe (DE); Jörg Hermes, Bruchsal (DE); Jürgen Hoffmeister, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/284,634

(22) PCT Filed: Sep. 27, 2019

(86) PCT No.: PCT/EP2019/025322
§ 371 (c)(1),
(2) Date: Apr. 12, 2021

(87) PCT Pub. No.: WO2020/074118
PCT Pub. Date: Apr. 16, 2020

(65) Prior Publication Data
US 2021/0396306 A1 Dec. 23, 2021

(30) Foreign Application Priority Data
Oct. 12, 2018 (DE) .......................... 102018008069.3

(51) Int. Cl.
| | |
|---|---|
| *F16H 57/02* | (2012.01) |
| *F16H 57/04* | (2010.01) |
| *F16H 57/03* | (2012.01) |
| *B33Y 80/00* | (2015.01) |
| *F16H 57/021* | (2012.01) |

(Continued)

(52) U.S. Cl.
CPC .............. *F16H 57/03* (2013.01); *B33Y 80/00* (2014.12); *F16H 57/021* (2013.01);
(Continued)

(58) Field of Classification Search
CPC ........ F16H 57/02; F16H 57/021; F16H 57/03; F16H 57/031; F16H 57/032;
(Continued)

(56) References Cited

U.S. PATENT DOCUMENTS

| | | | | |
|---|---|---|---|---|
| 2,270,980 | A | * | 1/1942 | Tidball .................... F16H 57/03 74/606 R |
| 3,347,341 | A | * | 10/1967 | Avrea ...................... G01F 23/02 184/108 |
| 10,066,731 | B2 | * | 9/2018 | Barton .................... F16H 57/03 |
| 10,151,380 | B2 | | 12/2018 | Uesugi et al. |
| 10,161,498 | B2 | * | 12/2018 | Sasaki .................. F16H 57/025 |

(Continued)

FOREIGN PATENT DOCUMENTS

| | | |
|---|---|---|
| CN | 102691779 A | 9/2012 |
| CN | 103899714 A * | 7/2014 |

(Continued)

OTHER PUBLICATIONS

International Search Report issued in corresponding International Application No. PCT/EP2019/025322, dated Jan. 13, 2020, pp. 1-3, English Translation.

*Primary Examiner* — Adam D Rogers
(74) *Attorney, Agent, or Firm* — Carter, DeLuca & Farrell LLP

(57) ABSTRACT

In a transmission having a transmission housing, e.g., a transmission housing part, the transmission housing has a support structure that includes webs, and the transmission housing has connection surfaces which are connected to webs of the support structure. The support structure together with the connection surfaces is produced in an additive manner, e.g., by 3D printing, the connection surfaces with the webs, for example, forming an oil-tight housing part.

19 Claims, 5 Drawing Sheets

(51) Int. Cl.
*F16H 57/032* (2012.01)
*F16H 57/031* (2012.01)

(52) U.S. Cl.
CPC ......... *F16H 57/032* (2013.01); *F16H 57/045* (2013.01); *F16H 57/0424* (2013.01); *F16H 57/031* (2013.01); *F16H 2057/02017* (2013.01); *F16H 2057/02091* (2013.01)

(58) Field of Classification Search
CPC ............... F16H 57/0424; F16H 57/045; F16H 57/0457; F16H 2057/02017; F16H 2057/02091; B33Y 80/00
See application file for complete search history.

(56) References Cited

U.S. PATENT DOCUMENTS

| | | | |
|---|---|---|---|
| 10,677,341 B2* | 6/2020 | Kuhnt | ................... F16H 57/03 |
| 2018/0259056 A1 | 9/2018 | Uesugi et al. | |
| 2020/0208730 A1* | 7/2020 | Liou | ................... F16H 57/0417 |
| 2021/0162860 A1* | 6/2021 | Peterson | ................ B60K 25/06 |

FOREIGN PATENT DOCUMENTS

| | | | | |
|---|---|---|---|---|
| CN | 107387735 A | | 11/2017 | |
| CN | 108223772 A | * | 6/2018 | |
| CN | 111823486 A | * | 10/2020 | |
| DE | 102016011664 A1 | | 3/2017 | |
| DE | 102016103029 A1 | * | 8/2017 | ........... F16H 57/028 |
| JP | 2017150536 A | | 8/2017 | |
| WO | WO-2009034746 A1 | * | 3/2009 | ............. F16H 57/03 |

\* cited by examiner

TRANSMISSION INCLUDING A TRANSMISSION HOUSING

FIELD OF THE INVENTION

The present invention relates to a transmission that includes a transmission housing.

BACKGROUND INFORMATION

Certain convention transmissions have a transmission housing.

SUMMARY

Example embodiments of the present invention provide a transmission housing in a material-saving manner.

According to an example embodiment of the present invention, in a transmission having a transmission housing, e.g., a transmission housing part, the transmission housing includes a support structure made up of webs, and the transmission housing includes connection surfaces which are connected to webs of the support structure. The support structure together with the connection surfaces is produced in an additive manner, e.g., by 3D printing. The connection surfaces with the webs, for example, form an oil-tight housing part.

This has the advantage that with the aid of the additive production using a 3D printer, the transmission housing is able to be provided with a bionic support structure which conducts the flow of forces that occurs or is permitted during the operation, and the support structure is able to be provided in an oil-tight manner with the aid of connection surfaces. Thus, the bionic support structure also has one or more web(s) which is/are routed through the interior space of the transmission housing. The flow of forces between the bearing supports and/or the receptacle for a transmission cover is therefore able to be routed through the support structure in an optimal manner. The thickness of the webs is adaptable to the individual flow of force. The support structure can thus be arranged only with a material distribution that corresponds to the flow of forces so that the transmission is able to be produced using as little material as possible.

In addition to the force flow, further functions such as oil channels are able to be integrated into the support structure, in which case the thickness of the webs of the support structure is appropriately increased. However, the hollow configuration of the webs produces high stiffness so that not much additional material is required for integrating the oil transport into the support structure. A separate piping connection to a pipe system may thus be saved. Moreover, the integration of the oil transport improves the thermal equalization and a uniform temperature of the transmission is induced.

According to example embodiments, the webs are connected to one another and/or to a bearing support and/or to a receptacle for a transmission cover. This provides the advantage that the forces, e.g., transverse forces, that occur during the operation are directly dissipated by the bearing supports via the support structure, which means that the connection surfaces are operable free of forces or at least with a minimum of forces, or in other words, oil tightness, for example, can thereby be ensured in a material-saving manner.

According to example embodiments t, one of the webs, e.g., a handle-shaped web, connects two points of the transmission cover and is set apart from the transmission housing, e.g., from the support structure. This provides the advantage that the force flow may also be routed through the interior space, provided no toothed part of the transmission is situated there.

According to example embodiments, the transmission housing has bearing supports and a receptacle for a transmission cover, webs of the support structure are connected to one of the bearing supports and/or to the receptacle, and the bearing supports and the receptacle together with the support structure and the connection surfaces, for example, are produced in an additive manner, e.g., by 3D printing. This is considered advantageous insofar as the forces are able to be conveyed from the bearing supports via the webs to a respective bearing support or receptacle for a transmission cover. The receptacles are reinforced, ring-type structures. The bearing supports are closed in the form of a ring and arranged in such a stable manner that machining, e.g., by grinding, is possible, so that a bearing support, e.g., a bearing seat, is able to be produced in which a bearing such as an anti-friction bearing and/or ball bearing can then be accommodated.

According to example embodiments, each web of the support structure has a different shape in comparison with any other web of the support structure. This provides the advantage that the web is able to be formed in a bionic manner. The shape is thus optimized for the force flow. As a result, the force flow can be conducted in an effective manner using a minimum of material.

According to example embodiments, each connection surface has a different shape in comparison with any other connection surface of the transmission housing. This provides the advantage that the oil tightness, and thus the housing function, can be ensured using a minimum of material. This is because the connection surfaces are able to be operated free of forces.

According to example embodiments, each web has in two different locations at least two cross-sectional surfaces that differ from each other. This is considered advantageous insofar as the characteristic of the cross-section of the web in the web direction is able to be optimized for the force flow to be passed through.

According to example embodiments, each web has a curved configuration and/or each connection surface has a curved configuration. This provides the advantage that the force flow is able to be passed through, on the one hand, and high stiffness of the support structure is achievable, on the other hand, especially with a low outlay in material.

According to example embodiments, a channel structure formed by channels is arranged in the transmission housing, e.g., in the wall of the transmission housing, e.g., in the support structure. This is considered advantageous insofar as no additional part, e.g., no piping system, is required for conducting the oil. Moreover, a thermal equalization and thus a uniform temperature possible is achievable in the transmission housing. This allows for an efficient heat dissipation. The additional material expenditure required for the channels can be kept to a minimum because the hollow structure is stiffer.

According to example embodiments, the channel structure has branches, e.g., at least three channels in each case running into one another in the respective branching. This has the advantage of achieving greater stiffness and stability as well as an optimized space utilization.

According to example embodiments, a first outlet opening of a first channel of the channel structure discharges into a collection trough, and a second outlet opening of the first channel or of some other channel of the channel structure discharges into a bearing support in order to lubricate a bearing, the transmission housing, for example, being formed such that oil splattered toward the top is at least partially conveyed to the collection trough. This is considered advantageous insofar as the conveying of lubricating oil allows for a better lubrication and thus for a more efficient utilization of the transmission.

According to example embodiments, a first outlet opening of a second channel discharges into a first oil pan of the transmission housing, and a second outlet opening of the second channel discharges into a second oil pan. A raised region is arranged on the transmission housing between the first and the second oil pan, i.e., the transmission housing, for example, has a higher configuration and/or the transmission housing has a constricted inner cross-section of the interior space region of the transmission housing. The first and the second oil pan are a subregion of the transmission housing in each case. This has the advantage that it allows for an increase in the oil level in the particular oil pan that would be emptied during the operation by the movement of the toothed parts or whose oil level would at least be reduced.

According to example embodiments, each channel of the channel structure has a curved extension and/or has a different cross-section at least in a first location, e.g., a different cross-sectional surface and/or a different cross-sectional surface value, than in a second location, the first location being set apart from the second location. This has the advantage that the channels are able to be formed such that high stiffness and an optimal force transmission are possible using a minimum of material, the cross-sectional surface of the channel exceeding a threshold value, e.g., a minimum surface value, in all locations of the channel.

According to example embodiments, a first outlet opening of a second channel discharges into a depression of the transmission housing which is formed by the support structure together with the connection surfaces and functions as the first oil pan, and a second outlet opening of the second channel discharges into a depression of the transmission housing which is formed by the support structure together with the connection surfaces and functions as the second oil pan. The transmission housing has a constricted inner diameter or cross-section of the interior space region of the transmission housing between the first and the second oil pan, and/or the support structure has a higher configuration, e.g., has a raised region, between the first and the second oil pan. This is considered advantageous insofar as an equalization of the oil levels is possible, that is to say, a return flow of oil and an increase in the oil level that is reduced during the operation. The interposed raised region or constriction has the advantage that the contour of the transmission housing follows the envelope of the toothed parts as closely as possible.

According to example embodiments, the support structure together with the connection surfaces, the bearing supports and/or the receptacle for the transmission cover are produced in an additive manner. This is considered advantageous insofar as the transmission housing is able to be produced in a single production step.

According to example embodiments, at least one of the bearing supports and/or the receptacle for the transmission cover is/are produced as a cast part in each case, the support structure together with the connection surfaces, for example, being produced in an additive manner, the transmission housing, for example, being produced as a composite part including bearing supports and/or the receptacle for the transmission cover and the support structure together with the connection surfaces. This provides the advantage that the transmission housing is able to be produced as a composite part including receptacles produced by casting and a support structure including connection surfaces produced thereon in an additive manner. This is because the receptacles are able to be produced with a great stiffness and in a precise manner with the aid of cutting methods. The bionic form of the support structure may be obtained nevertheless and can be produced in a material-saving manner.

According to example embodiments, the transmission housing is made from metal, e.g., aluminum, and, for example, is produced in an additive manner. This provides the advantage that a stable metal housing is able to be provided. Because of the additive production, great stiffness and stability are achievable at a low outlay for material. Moreover, the bionic form of the support structure together with the connection surfaces is unable to be produced, or at least not in an economical fashion, by classic mold casting.

Further features and aspects of example embodiments of the present invention are described in greater detail below with reference to the appended schematic Figures.

BRIEF DESCRIPTION OF THE DRAWINGS

In contrast to FIG. 1.

DETAILED DESCRIPTION

Figure 1:
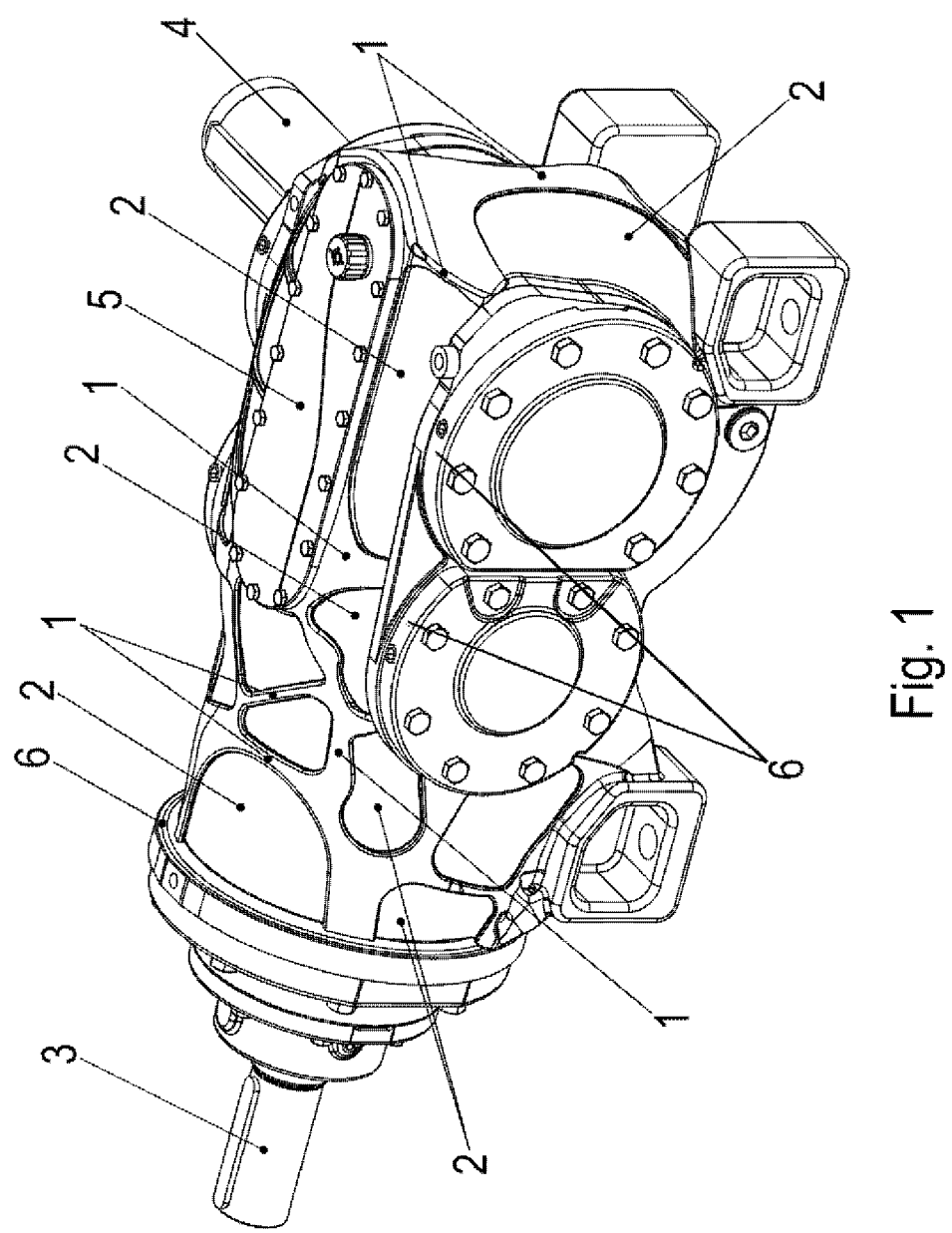
FIG. 1 is a perspective view of a transmission according to an example embodiment of the present invention having a transmission housing and a transmission cover 5.

As schematically illustrated in the Figures, the transmission housing is produced in an additive manner, e.g., by a 3D printer. Metal, e.g., aluminum, is used as the material for the transmission housing.

The transmission housing includes a support structure, which is formed of interconnected webs 1. In addition, some of webs 1 are connected to bearing support 6 and to the receptacle for transmission cover 5. Webs 1 have different shapes in each case. More specifically, they have a curved contour. Each web 1 may have at least two different cross-sections.

The support structure resembles a skeleton. Connection surfaces 2 extend across exposed surfaces between webs 1 so that an oil-tight transmission housing is formed by the support structure together with connection surfaces 2.

At least one of webs 1 extends from a first location of the transmission housing to another location of the transmission housing, this web 1 projecting into the interior space and at least regionally being set apart from the transmission housing. An engagement behind this web 1 is therefore possible.

In principle, the support structure is used for conducting the flow of forces when the transmission is in operation.

Connection surfaces 2 have a lower wall thickness than webs 1. The support structure also connects the receptacle for transmission cover 5 to bearing supports 6, which means that they are not only supported but that transverse forces that arise during the operation are routed through the support structure. Connection surfaces 2 are mainly used for the oil tightness but not for the conduction of forces.

Each of the more than fifteen connection surfaces 2 has its individual shape, that is to say, differs from all other connection surfaces 2 of the transmission housing, each of the connection surfaces, for example, being curved. In the same manner, each of the more than fifteen webs 1 has its individual shape and thus, for example, differs from all other webs 1 of the transmission housing.

Figure 2:
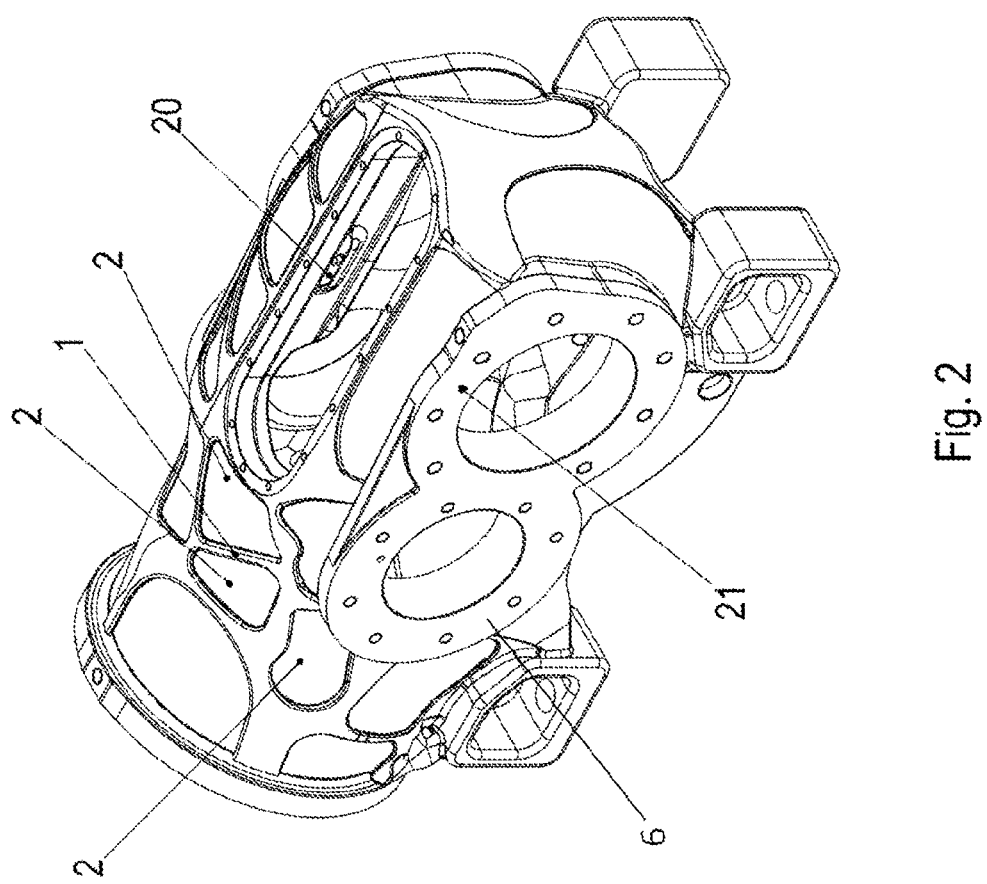
FIG. 2 illustrates the transmission with the transmission cover removed.
Figure 3:
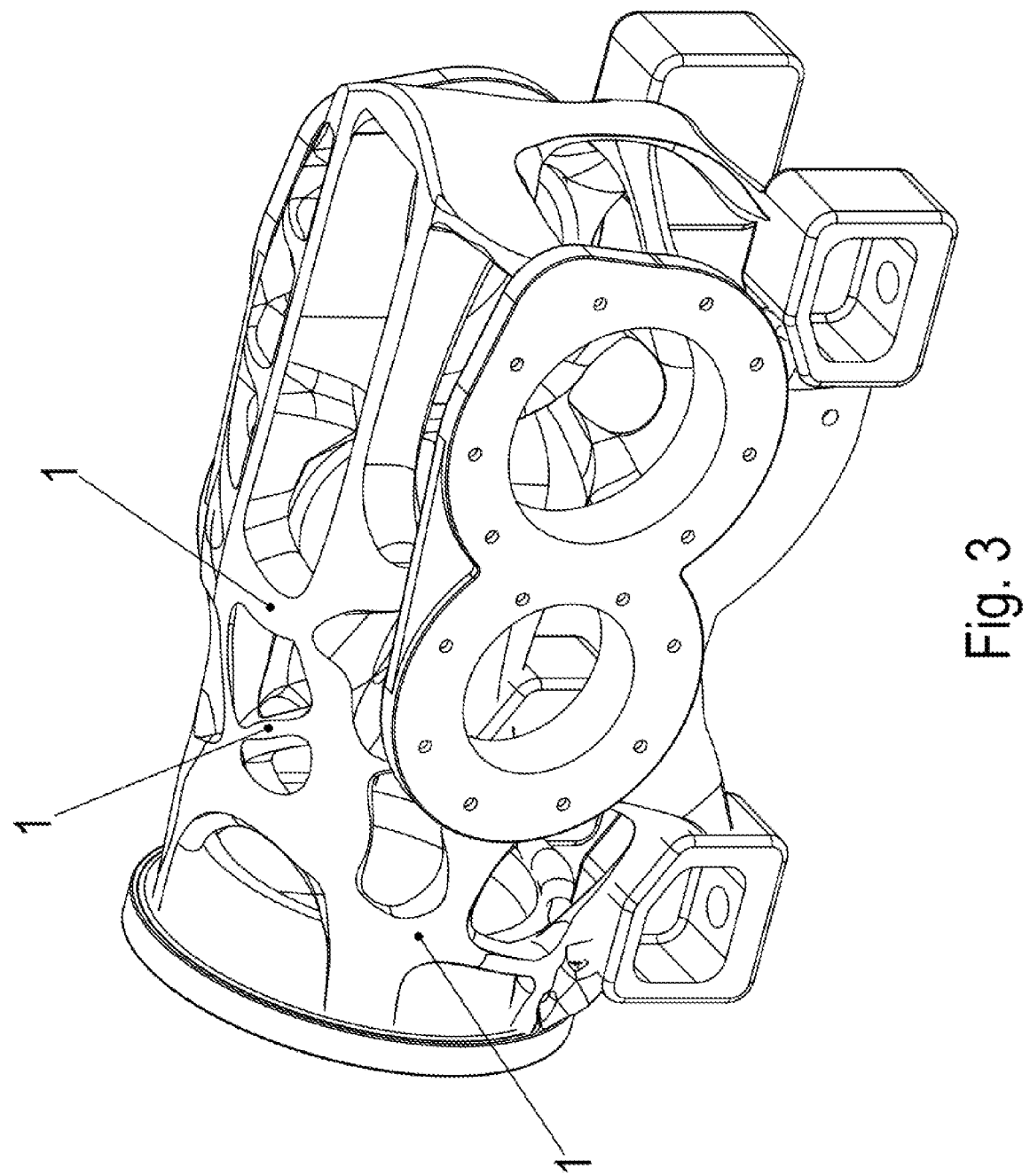
FIG. 3 illustrates the support structure including of webs 1 together with bearing supports 6 and the receptacle for transmission cover 5, the connection surfaces connecting the webs having been removed.
Figure 4:
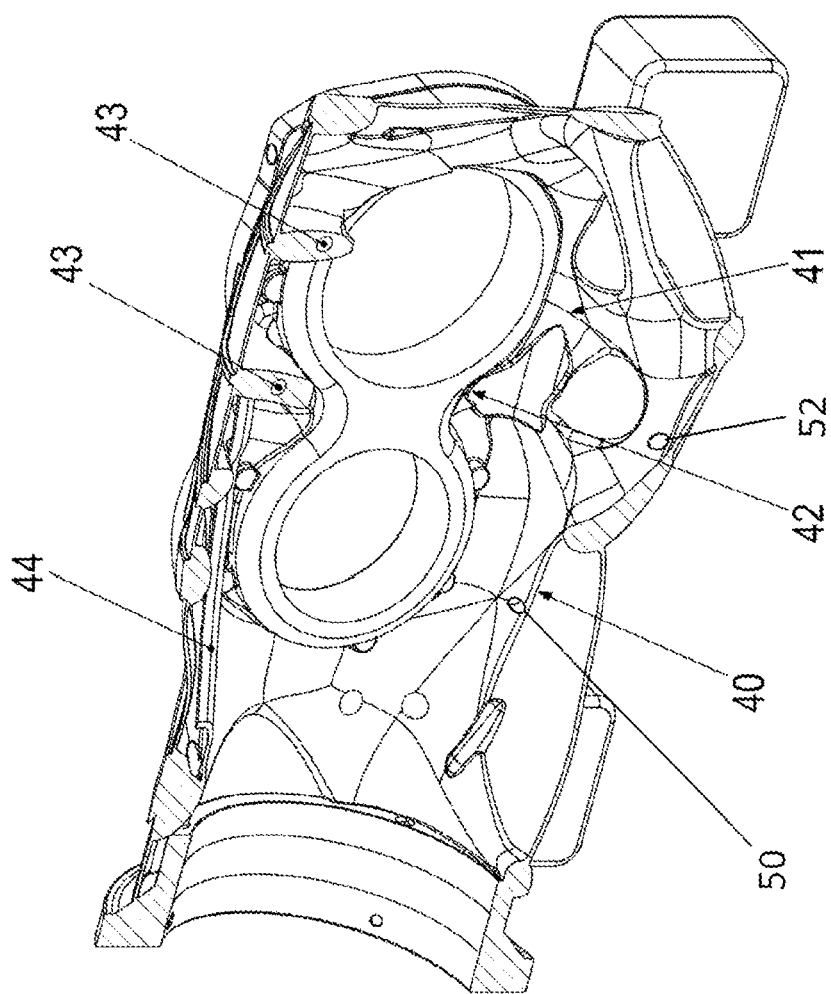
FIG. 4 is a cross-sectional view of the transmission housing.

As illustrated in FIG. 2, an oil collection trough 20 is arranged on the inner side of the transmission housing. In addition, a wiping device is provided in the interior of the transmission, which conveys the oil wiped off by the wiping device to oil collection trough 20 independently of the direction of rotation. Channels 43 within the support structure lead from this oil collection trough 20 to bearings, e.g., bearing seats or bearing flanges, so that the oil emerging from respective outlet opening 21 of the individual channel lubricates the bearings.

Each of the channels leading from an outlet opening of a respective channel to an end region of the respective channel ending in another channel or leading to some other outlet opening of the respective channel is curved and, for example, has at least two different channel cross-sections, and thus is one-of-a-kind, i.e., unique, among the totality of all channels formed on the transmission housing.

A further channel is integrated into the transmission housing and also extends within the wall of the transmission housing. This further channel is used for equalizing the oil level between two subregions of the oil sump of the transmission. This is because the transmission housing is formed so that it comes as close as possible to the contour of the toothed parts. Since the transmission has two toothed wheels whose toothed systems mesh with one another and whose axes of rotation are aligned in parallel and set apart from each other, the transmission housing has on its floor two depressions, which are set apart from each other by a raised region 42 and, for example, are arranged as oil pans 40, 41.

The further channel discharges via its first outlet opening 50 into first oil pan 40 and by its second outlet opening 52 into second oil pan 41. An equalization of the two oil levels of the two oil pans 40 and 41 is possible as a result. The further channel extends underneath raised region 42.

Figure 5:
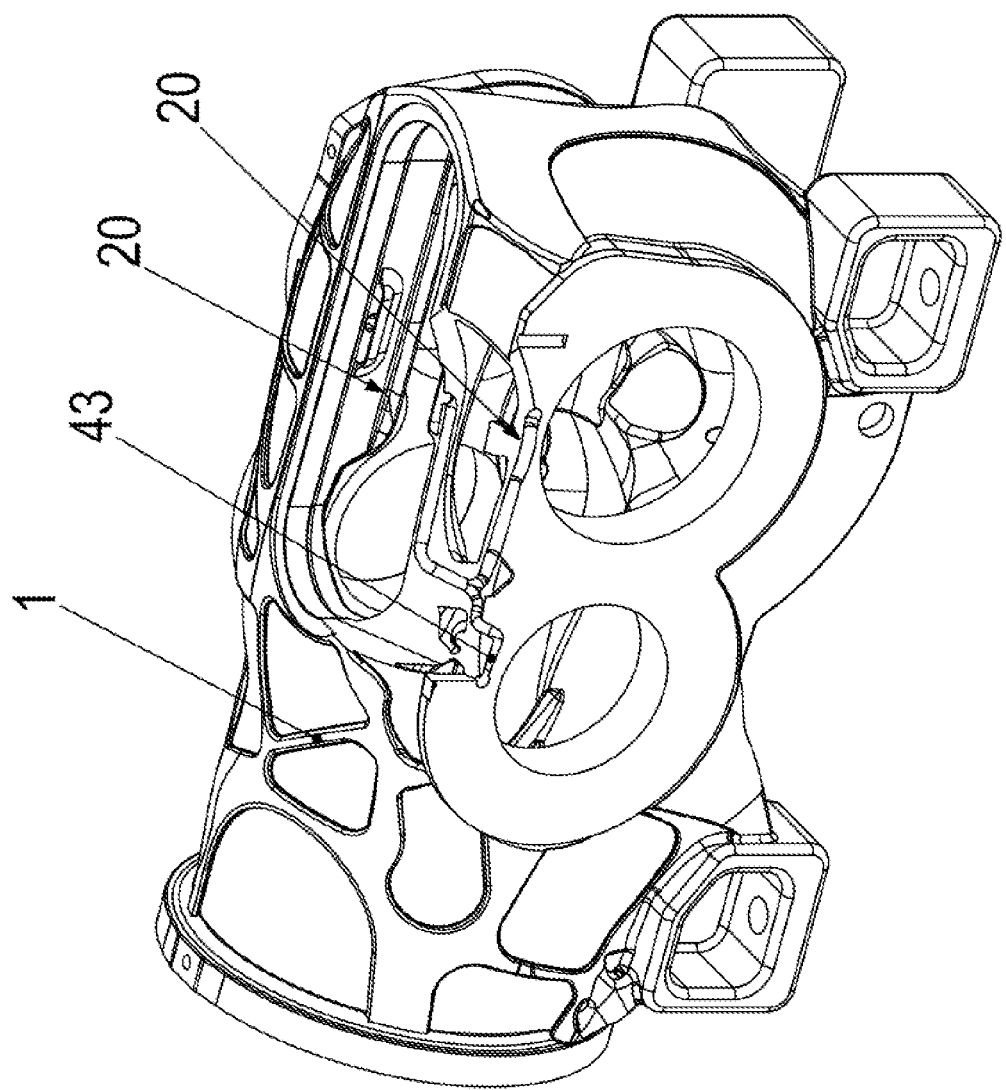
FIG. 5 illustrates the transmission housing having an oil collection trough.

FIG. 5 shows oil collection trough 20; the oil that is wiped off by the wiping device at the smooth side surface of the rotating toothed wheel, e.g., a spur wheel, is conducted into channel 43, which leads to the bearing supports of the bearings. More specifically, one of the bearings is the particular bearing that supports the toothed wheel in a rotatable manner.

In further exemplary embodiments, bearing supports 6 and the receptacle for transmission cover 5 are produced as cast parts and the support structure together with the connection surfaces is produced thereon in an additive manner, e.g., by 3D printing.

LIST OF REFERENCE NUMERALS

1 web
2 connection surface
3 input shaft
4 output shaft
5 transmission cover
6 bearing support
20 oil collection trough
21 outlet opening of the channel
40 first oil pan
41 second oil pan
42 raised region between the first and second oil pan section
43 channel
44 further channel
50 outlet opening
52 outlet opening

The invention claimed is:

1. A transmission, comprising:
a transmission housing having a support structure that includes webs, the transmission housing having connection surfaces connected to the webs of the support structure, the support structure and the connection surfaces being arranged as additively manufactured components;
wherein the transmission housing includes bearing supports and a receptacle for a transmission cover, at least one of the webs of the support structure being connected to one of the bearing supports and/or to the receptacle, the bearing supports and the receptacle together with the support structure and the connection surfaces being produced in an additive manner and/or as 3D printed components.

2. The transmission according to claim 1, wherein the transmission housing is arranged as a transmission housing part.

3. The transmission according to claim 1, wherein the support structure and the connection surfaces are 3D-printed components.

4. The transmission according to claim 1, wherein the connection surfaces and the webs form an oil-tight housing part.

5. The transmission according to claim 1, wherein one of the webs connects two points of the transmission cover and is set apart from the transmission housing.

6. The transmission according to claim 1, wherein each web has in two different locations at least two cross-sectional surfaces that differ from each other, each web has a curved configuration and/or each connection surface has a curved configuration, and/or a channel structure formed by channels is arranged in the transmission housing, in a wall of the transmission housing, and/or within the support structure.

7. The transmission according to claim 1, wherein a channel structure formed by channels is arranged in the transmission housing, in a wall of the transmission housing, and/or within the support structure, at least three of the channels running into one another at a respective branching.

8. The transmission according to claim 7, wherein each channel of the channel structure has a curved extension and/or has a different cross-section, a different cross-section surface, and/or a different cross-sectional surface area in at least a first location than in a second location, the first location being set apart from the second location.

9. The transmission according to claim 1, wherein the transmission housing is formed of a metal and/or aluminum and/or is formed additively.

10. The transmission according to claim 1, wherein the support structure together with the connection surfaces, bearing supports, and/or the receptacle for the transmission cover are formed additively.

11. The transmission according to claim 1, wherein at least one of the bearing supports and/or the receptacle for the transmission cover is arranged as a cast part, the support structure together and the connection surfaces being formed additively, the transmission housing being arranged as a composite part including the bearing support and/or the receptacle for the transmission cover and the support structure together with the connection surfaces.

12. The transmission according to claim 1, wherein each bearing support is adapted to support a respective bearing adapted to mount a respective toothed part of the transmission, an interior space of the transmission surrounded by the transmission housing adapted to be least partially filled with lubricating oil, the transmission cover being accommodated in the receptacle for the transmission cover and screw-connected to the transmission housing, an opening of the receptacle for the transmission cover having a size and shape such that a shaft and/or the toothed part of the transmission is guidable through the opening.

13. A transmission, comprising:
a transmission housing having a support structure that includes webs, the transmission housing having connection surfaces connected to the webs of the support structure, the support structure and the connection surfaces being arranged as additively manufactured components;
wherein a channel structure formed by channels is arranged in the transmission housing, in a wall of the transmission housing, and/or within the support structure, at least three of the channels running into one another at a respective branching; and
wherein a first outlet opening of a first channel of the channel structure discharges into a collection trough, and a second outlet opening of the first channel or of another channel of the channel structure discharges into a bearing support for lubricating a bearing.

14. The transmission according to claim 13, wherein the transmission housing is arranged such that oil splattered toward a top is at least partially conveyed to the collection trough.

15. The transmission according to claim 13, wherein a first outlet opening of a second channel discharges into a first oil pan of the transmission housing, and a second outlet opening of the second channel discharges into a second oil pan, a raised region being arranged on the transmission housing between the first oil pan and the second oil pan, the first oil pan and the second oil pan being arranged as subregions of the transmission housing.

16. The transmission according to claim 15, wherein the transmission housing has a constricted inner cross-section of an interior space region of the transmission housing.

17. The transmission according to claim 13, wherein a first outlet opening of a second channel discharges into a depression of the transmission housing formed by the support structure together with the connection surfaces and arranged as a first oil pan, and a second outlet opening of the second channel discharges into a depression of the transmission housing formed by the support structure together with the connection surfaces and arranged as a second oil pan, the transmission housing having a constricted inner diameter and/or cross-section of an interior space region of the transmission housing between the first oil pan and the second oil pan, and/or the support structure having a raised region between the first oil pan and the second oil pan.

18. A Previously Presented transmission, comprising:
a transmission housing having a support structure that includes webs, the transmission housing having connection surfaces connected to the webs of the support structure, the support structure and the connection surfaces being arranged as additively manufactured components;
wherein each web of the support structure has a different shape in comparison with any other web of the support structure and/or each connection surface has a different shape in comparison with any other connection surface of the transmission housing.

19. The transmission according to claim 18, wherein the webs are connected to one another and/or to a bearing support and/or a receptacle for a transmission cover.

* * * * *